United States Patent
Linggajaya

(10) Patent No.: US 10,944,341 B2
(45) Date of Patent: Mar. 9, 2021

(54) ENERGY RECOVERY FROM A SPINDLE MOTOR USING A SEQUENCE OF A BRAKING PHASE, AN ACTIVE STEP-UP PHASE AND AN ACTIVE BRAKING PHASE IN RESPONSE TO EXTERNAL POWER SUPPLY FAILURE

(71) Applicant: STMicroelectronics Asia Pacific Pte Ltd, Singapore (SG)

(72) Inventor: Kaufik Linggajaya, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/410,674

(22) Filed: May 13, 2019

(65) Prior Publication Data

US 2019/0356249 A1 Nov. 21, 2019

Related U.S. Application Data

(60) Provisional application No. 62/671,558, filed on May 15, 2018.

(51) Int. Cl.
*H02P 3/14* (2006.01)
*G11B 19/20* (2006.01)

(52) U.S. Cl.
CPC ............ *H02P 3/14* (2013.01); *G11B 19/2009* (2013.01)

(58) Field of Classification Search
CPC ... G11B 19/047; G11B 5/022; G11B 19/2081; H02P 6/085; H02P 7/04; H02P 29/025; H02P 3/14; H02P 27/06; H02H 7/0838; H02H 7/08; H02J 7/345
See application file for complete search history.

(56) References Cited

U.S. PATENT DOCUMENTS

| | | | |
|---|---|---|---|
| 6,549,361 B1 | 4/2003 | Bennett et al. | |
| 7,705,548 B2 * | 4/2010 | Galbiati | G11B 5/54 318/3 |
| 9,742,319 B2 * | 8/2017 | Marvelly | H02P 6/26 |
| 2006/0007581 A1 * | 1/2006 | Brenden | G11B 5/54 360/75 |
| 2013/0041620 A1 * | 2/2013 | Huam | B60L 50/50 702/142 |
| 2014/0300987 A1 * | 10/2014 | Otaguro | H02P 6/24 360/71 |
| 2019/0356249 A1 * | 11/2019 | Linggajaya | H02P 29/025 |

* cited by examiner

*Primary Examiner* — Bickey Dhakal
(74) *Attorney, Agent, or Firm* — Crowe & Dunlevy

(57) ABSTRACT

The half-bridges driving a multiphase motor are controlled to perform a sequence of operations to support charging a hold capacitor. First, in a brake configuration, the half-bridge transistors are controlled such that either high-side transistors or low-side transistors of the half-bridges are turned on. Second, in an active step-up configuration, the half-bridge transistors are controlled such that the high-side transistor of a first half-bridge and the low-side transistor of a second half-bridge are both turned on and the low-side transistor of the first half-bridge and the high-side transistor of the second half-bridge are both turned off. Third, in an active brake configuration, the half-bridge transistors are controlled such that the low-side transistor of the first half-bridge and the high-side transistor of the second half-bridge are both turned on and the high-side transistor of the first half-bridge and the low-side transistor of the second half-bridge stage are both turned off.

29 Claims, 5 Drawing Sheets

ENERGY RECOVERY FROM A SPINDLE MOTOR USING A SEQUENCE OF A BRAKING PHASE, AN ACTIVE STEP-UP PHASE AND AN ACTIVE BRAKING PHASE IN RESPONSE TO EXTERNAL POWER SUPPLY FAILURE

CROSS-REFERENCE TO RELATED APPLICATION

This application claims the priority benefit of United States Provisional Application for Patent Ser. No. 62/671,558 filed May 15, 2018, the disclosure of which is incorporated by reference.

TECHNICAL FIELD

The present disclosure relates to an enhancement of the process for energy recovery from a free-wheeling multiphase spindle motor in response to interruption of external power supply in order to charge an external capacitor.

BACKGROUND

In response to an external interruption of the power supply to a hard disk drive, the multiphase spindle motor is exploited as a generator to produce power for effectuating the ramp loading (parking) of the pick-up carrying arm. The voltage of the generator depends on the speed of rotation and the electrical constant of the multiphase spindle motor. By rectifying the back electromotive forces (BEMF) induced in the phase windings of the multiphase spindle motor, a rectified charge current is applied to an external hold capacitor that is connected to the power supply node of the output drive bridge stage of the multiphase spindle motor and voice coil motor, with the voice coil motor being actuated to cause movement of the pick-up carrying arm for an amount of time needed for safely parking the pick-up carrying arm.

FIG. 1 shows a circuit diagram for a conventional output drive bridge circuit 10 for driving a multiphase spindle motor 12. In this example, the multiphase spindle motor 12 is a three-phase motor having a first phase winding PhA, a second phase winding PhB and a third phase winding PhC. Each phase winding may be represented by its equivalent circuit schematic comprising the series electrical connection of a back EMF voltage, an inductance and a resistance. In one embodiment, as illustrated, each phase winding is connected between a corresponding control terminal A, B or C of the multiphase spindle motor 12 and a center tap CT of the multiphase spindle motor 12 having a Y-type configuration. In an alternative embodiment, each phase winding is connected between a corresponding pair of control terminals A, B or C of the multiphase spindle motor 12 having a delta (Δ)-type configuration. The output drive bridge circuit 10 includes an output drive bridge stage 24x for each phase of the multiphase spindle motor 12 (where x designates the corresponding phase A, B, or C). Each output drive bridge stage 24x is configured as a half-bridge driver including a high side drive transistor 26 in series electrical connection with a low side driver transistor 28 between a motor power supply node 30 and a ground node 32. In particular, the source-drain paths of the transistors 26 and 28 are connected in series at a drive node 34x which is electrically connected to a corresponding control terminal A, B or C of the multiphase spindle motor 12. The transistors 26 and 28 are conventionally formed by n-channel power MOSFET devices. The drain of transistor 26 is connected to the power supply node 30, the source of transistor 26 is connected to the drive node 34x, the drain of transistor 28 is connected to the drive node 34x and the source of transistor 28 is connected to the ground node 32. The gate terminal of the transistor 26 is driven by a high side control signal Hx and the gate terminal of the transistor 28 is driven by a low side control signal Lx. The high side control signals Hx and the low side control signals Lx are generated by a motor controller circuit 40.

The external hold capacitor 46 is connected between the motor power supply node 30 and the ground node 32. An isolation transistor 50, for example, a p-channel MOSFET device, is connected between an external power supply node 52 and the motor power supply node 30. The external power supply node 52 is configured to receive an externally applied supply voltage VCV. The isolation transistor 50 is deactuated by the motor controller circuit 40 using control signal Iso in order to isolate the motor power supply node 30 from the external supply voltage VCV in the event the external supply voltage VCV is interrupted. In response to such an interruption, the back electromotive forces that are induced in the phase windings of the rotating multiphase spindle motor 12 are rectified by the intrinsic current recirculation diodes D of the power MOSFET devices of the output drive bridge stages 24x of the multiphase spindle motor 12. This generates current for charging the external hold capacitor 46 so as to hopefully maintain a voltage level at the motor power supply node 30 which is sufficient for a limited time period to power the control circuitry and drivers of the voice coil motor (VCM) to safely park the pick-up carrying arm.

In one known embodiment, the process for recovery of the back electromotive force induced in the phase windings of the spindle motor includes a first phase, referred to in the art as a brake phase, where the motor controller generates the Hx and Lx control signals such that the transistors 26 in all of the output drive bridge stages 24x are turned off and the transistors 28 in all of the output drive bridge stages 24x are turned on. This circuit configuration effectively short circuits the phase windings of the multiphase spindle motor and the three BEMFs produce three currents of polarity and value that are a function of the angular position of the rotor. For example, with respect to one of six possible current circulation directions dependent on rotor position, a current of the A phase would be entering the motor through winding PhA, while currents in the B and C phases would be exiting the motor through windings PhB and PhC. A rectification of the BEMF of the spindle motor occurs in a second phase, referred to in the art as a tristate phase, where the motor controller generates the Hx and Lx control signals such that the transistors 26 and 28 in all of the output drive bridge stages 24x are turned off. During the tristate phase, the three currents in the windings of the motor recirculate through the intrinsic diodes D of the power MOSFETs. With respect to the same example current circulation direction based on rotor position, currents in the B and C phases from the phase windings PhB and PhC flow toward the motor power supply node 30 through the intrinsic diodes D of the high side drive transistors 26 of output drive bridge stages 24B and 24C, while current in the A phase into the phase winding PhA comes from the ground node 32 flowing through the intrinsic diode D of the low side drive transistor 28 of output drive bridge stage 24A. Thus, the recirculation loop of the three currents of the windings of the motor closes through the hold capacitor 46 connected between the supply nodes 30 and 32 and effectively charges that capacitor.

FIG. 2 shows a timing diagram for the recovery process using the first (brake) phase followed by the second (tristate)

phase. These two phases are sequentially repeated. Every time the configuration of the output bridge stage switches from the "brake" configuration to the "tristate" configuration, the recirculating motor current charges the capacitor 46. This causes the voltage on the supply node 30 to be incremented.

In another known embodiment, the process for recovery of the back electromotive force induced in the phase windings of the spindle motor includes a first phase, referred to in the art as the brake phase, where the motor controller generates the Hx and Lx control signals such that the transistors 26 in all of the output drive bridge stages 24x are turned off and the transistors 28 in all of the output drive bridge stages 24x are turned on. This circuit configuration effectively short circuits the phase windings of the multiphase spindle motor and the three BEMFs produce three currents of polarity and value that are a function of the angular position of the rotor. For example, with respect to one of six possible current circulation directions dependent on rotor position, a current of the A phase would be entering the motor through winding PhA, while currents in the B and C phases would be exiting the motor through windings PhB and PhC. A rectification of the BEMF of the spindle motor occurs in a second phase, referred to in the art as an active step-up phase, where the motor controller generates the Hx and Lx control signals to selectively turn on certain ones of the power MOSFETs and selectively turn off certain other ones of the power MOSFETs dependent on the angular position of the rotor. During the active step-up phase, the three currents in the windings of the motor recirculate through the selectively turned on ones of the power MOSFETs. With respect to the same example current circulation direction based on rotor position, the high side drive transistors 26 of output drive bridge stages 24B and 24C are selectively turned on and the currents in the B and C phases from the phase windings PhB and PhC flow toward the motor power supply node 30, while the low side drive transistor 28 of output drive bridge stage 24A is also selectively turned on and the current in the A phase into the phase winding PhA comes from the ground node 32, and all other power MOSFETs are turned off. Thus, the recirculation loop of the three currents of the windings of the motor closes through the hold capacitor 46 connected between the supply nodes 30 and 32 and effectively charges that capacitor.

It is important to know rotor position prior to switching from the brake phase to the active step-up phase. The motor controller 40 may operate to detect rotor position by sensing voltages at the control terminals A, B and C (and perhaps also CT) of the multiphase spindle motor 12. This rotor position detection provides information that is indicative of which one of the six possible current circulation directions is currently active, and this information can then be used to control ON/OF state of the drive transistors for active step-up phase operation.

FIG. 3 shows a timing diagram for the recovery process using the first (brake) phase followed by the second (active step-up) phase. These two phases are sequentially repeated. Every time the configuration of the output bridge stage switches from the "brake" configuration to the "active step-up" configuration, the recirculating motor current charges the capacitor 46. This causes the voltage on the supply node 30 to be incremented. The operation to sense motor voltages and detect rotor position (that is indicative of which one of the six possible current circulation directions is currently active) occurs at or near the end of each brake phase.

In yet another known embodiment, the process for recovery of the back electromotive force induced in the phase windings of the spindle motor includes a first phase, referred to in the art as the brake phase, where the motor controller generates the Hx and Lx control signals such that the transistors 26 in all of the output drive bridge stages 24x are turned off and the transistors 28 in all of the output drive bridge stages 24x are turned on. This circuit configuration effectively short circuits the phase windings of the multiphase spindle motor and the three BEMFs produce three currents of polarity and value that are a function of the angular position of the rotor. For example, with respect to one of six possible current circulation directions dependent on rotor position, a current of the A phase would be entering the motor through winding PhA, while currents in the B and C phases would be exiting the motor through windings PhB and PhC. A rectification of the BEMF of the spindle motor occurs in connection with two subsequent phases. In a second phase, referred to in the art as the tristate phase, the motor controller generates the Hx and Lx control signals such that the transistors 26 and 28 in all of the output drive bridge stages 24x are turned off. During the tristate phase, the three currents in the windings of the motor may recirculate through the intrinsic diodes D of the power MOSFETs. With respect to the same example current circulation direction based on rotor position, currents in the B and C phases from the phase windings PhB and PhC flow toward the motor power supply node 30 through the intrinsic diodes D of the high side drive transistors 26 of output drive bridge stages 24B and 24C, while current in the A phase into the phase winding PhA comes from the ground node 32 flowing through the intrinsic diode D of the low side drive transistor 28 of output drive bridge stage 24A. Thus, the recirculation loop of the three currents of the windings of the motor closes through the hold capacitor 46 connected between the supply nodes 30 and 32 and effectively charges that capacitor. In a third phase, referred to in the art as the active step-up phase, the motor controller generates the Hx and Lx control signals to selectively turn on certain ones of the power MOSFETs and selectively turn off certain other ones of the power MOSFETs dependent on the angular position of the rotor. During the active step-up phase, the three currents in the windings of the motor recirculate through the selectively turned on ones of the power MOSFETs. With respect to the same example current circulation direction based on rotor position, the high side drive transistors 26 of output drive bridge stages 24B and 24C are selectively turned on and the currents in the B and C phases from the phase windings PhB and PhC flow toward the motor power supply node 30, while the low side drive transistor 28 of output drive bridge stage 24A is also selectively turned on and the current in the A phase into the phase winding PhA comes from the ground node 32, and all other power MOSFETs are turned off. Thus, the recirculation loop of the three currents of the windings of the motor closes through the hold capacitor 46 connected between the supply nodes 30 and 32 and effectively charges that capacitor.

It is important to know rotor position prior to switching from the tristate phase to the active step-up phase. The motor controller 40 may operate to detect rotor position by sensing voltages at the control terminals A, B and C (and perhaps also CT) of the multiphase spindle motor 12. This rotor position detection provides information that is indicative of which one of the six possible current circulation directions is currently active, and this information can then be used to control ON/OFF state of the drive transistors for active step-up phase operation.

FIG. 4 shows a timing diagram for the recovery process using the first (brake) phase followed by the second (tristate) phase followed by the third (active step-up) phase. These three phases are sequentially repeated. Every time the configuration of the output bridge stage switches from the "brake" configuration to the "tristate" and then "active step-up" configurations, the recirculating motor current charges the capacitor 46. This causes the voltage on the supply node 30 to be incremented. The operation to sense motor voltages and detect rotor position (that is indicative of which one of the six possible current circulation directions is currently active) occurs during each tristate phase.

SUMMARY

In an embodiment, a method is provided for charging a hold capacitor coupled between power supply nodes of output transistor half-bridge stages driving a multiphase motor. A failure of an external power supply detected. In response thereto, the following sequence of operations is performed: a) switching MOS transistors of the output transistor half-bridge stages to implement a brake configuration wherein either high-side MOS transistors or low-side MOS transistors of the output transistor half-bridge stages are turned on; b) then switching MOS transistors of the output transistor half-bridge stages to implement an active step-up configuration wherein the high-side MOS transistor of a first output transistor half-bridge stage and the low-side MOS transistor of a second output transistor half-bridge stage are both turned on and wherein the low-side MOS transistor of the first output transistor half-bridge stage and the high-side MOS transistor of the second output transistor half-bridge stage are both turned off; and c) then switching MOS transistors of the output transistor half-bridge stages to implement an active brake configuration wherein the low-side MOS transistor of the first output transistor half-bridge stage and the high-side MOS transistor of the second output transistor half-bridge stage are both turned on and wherein the high-side MOS transistor of the first output transistor half-bridge stage and the low-side MOS transistor of the second output transistor half-bridge stage are both turned off.

In an embodiment, a circuit for driving a multiphase motor comprises: a power supply node configured to receive an external power supply for powering the multiphase motor; a common reference node; a plurality of half bridges coupled between said power supply node and said common reference node, each half bridge comprising a high-side MOS transistor, a low-side MOS transistor and an output node coupled to a respective winding terminal of the multiphase motor; and a control circuit. The control circuit is configured to sense a failure of the external power supply. In response thereto, the following sequence of operations is performed: a) switch MOS transistors of the half bridges to implement a brake configuration wherein either high-side MOS transistors or low-side MOS transistors of the half bridges are turned on; b) then switch MOS transistors of the half bridges to implement an active step-up configuration wherein the high-side MOS transistor of a first half bridge and the low-side MOS transistor of a second half bridge are both turned on and wherein the low-side MOS transistor of the first half bridge and the high-side MOS transistor of the second half bridge are both turned off; and c) then switch MOS transistors of the half bridges to implement an active brake configuration wherein the low-side MOS transistor of the first half bridge and the high-side transistor of the second half bridge are both turned on and wherein the high-side MOS transistor of the first half-bridge and the low-side transistor of the second half bridge are both turned off.

BRIEF DESCRIPTION OF THE DRAWINGS

The foregoing and other features and advantages will be discussed in detail in the following non-limiting description of specific embodiments in connection with the following illustrations wherein.

DETAILED DESCRIPTION

Figure 1:
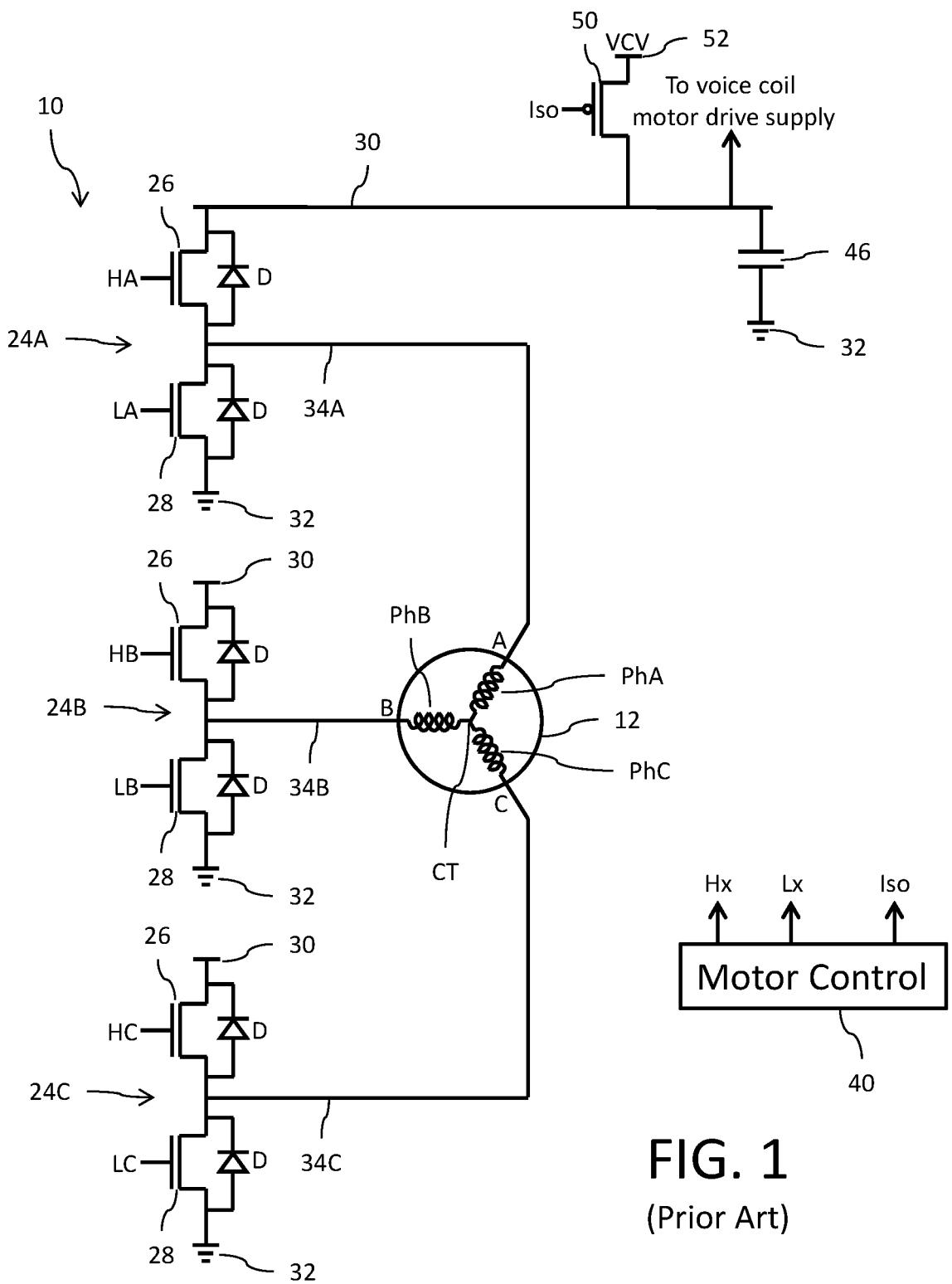
FIG. 1 is a circuit diagram of a conventional output drive bridge circuit for driving a multiphase spindle motor.
Figure 2:
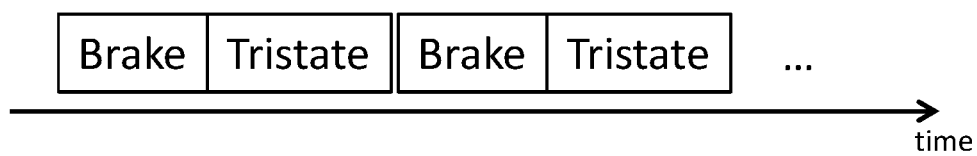
FIG. 2 is a timing diagram for a process for recovery of the back electromotive force induced in the phase windings of the spindle motor.
Figure 3:
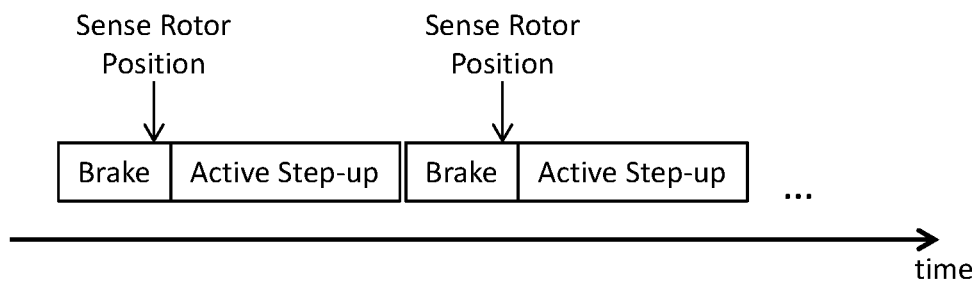
FIG. 3 is a timing diagram for another process for recovery of the back electromotive force induced in the phase windings of the spindle motor.
Figure 4:
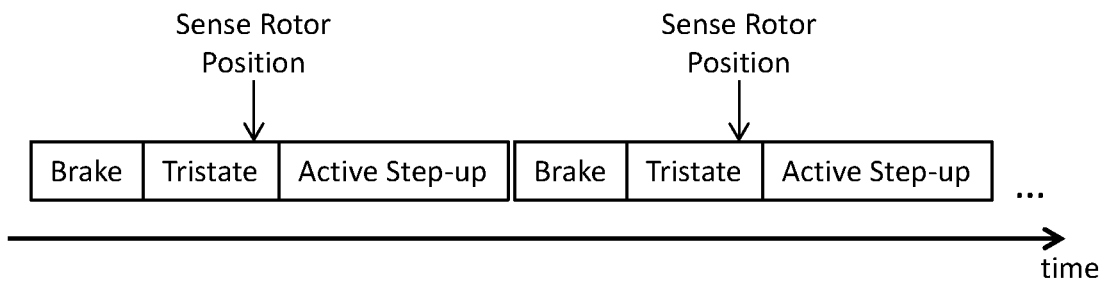
FIG. 4 is a timing diagram for yet another process for recovery of the back electromotive force induced in the phase windings of the spindle motor.

The same elements have been designated with the same reference numerals in the various drawings and, further, the various drawings are not to scale. For clarity, only those elements which are useful to the understanding of the described embodiments have been shown and are detailed.

An improved process for recovery of the back electromotive force induced in the phase windings of the spindle motor includes a first phase, referred to in the art as a brake phase, where the motor controller generates the Hx and Lx control signals such that the transistors 26 in all of the output drive bridge stages 24x are turned off and the transistors 28 in all of the output drive bridge stages 24x are turned on. This circuit configuration effectively short circuits the phase windings of the multiphase spindle motor and the three BEMFs produce three currents of polarity and value that are a function of the angular position of the rotor. For example, with respect to one of six possible current circulation directions dependent on rotor position, a current of the A phase would be entering the motor through winding PhA, while currents in the B and C phases would be exiting the motor through windings PhB and PhC.

It will be understood that in an alternative implementation of the first phase, the motor controller generates the Hx and Lx control signals such that the transistors 28 in all of the output drive bridge stages 24x are turned off and the transistors 26 in all of the output drive bridge stages 24x are turned on. This circuit configuration also effectively short circuits the phase windings of the multiphase spindle motor and produces the same three currents.

A rectification of the BEMF of the spindle motor occurs in connection with two subsequent phases. In a second phase, referred to in the art as a tristate phase, the motor controller generates the Hx and Lx control signals such that the transistors 26 and 28 in all of the output drive bridge stages 24x are turned off. During the tristate phase, the three currents in the windings of the motor may recirculate through the intrinsic diodes D of the power MOSFETs. With respect to the same example current circulation direction based on rotor position, currents in the B and C phases from the phase windings PhB and PhC flow toward the motor power supply node 30 through the intrinsic diodes D of the high side drive transistors 26 of output drive bridge stages 24B and 24C, while current in the A phase into the phase winding PhA comes from the ground node 32 flowing through the intrinsic diode D of the low side drive transistor 28 of output drive bridge stage 24A. Thus, the recirculation loop of the three currents of the windings of the motor closes through the hold capacitor 46 connected between the supply nodes 30 and 32 and effectively charges that capacitor. In a third phase, referred to in the art as an active step-up phase, the motor controller generates the Hx and Lx control signals to selectively turn on certain ones of the power MOSFETs and selectively turn off certain other ones of the power MOSFETs dependent on the angular position of the rotor. During the active step-up phase, the three currents in the windings of the motor recirculate through the selectively turned on ones of the power MOSFETs. With respect to the same example current circulation direction based on rotor position, the high side drive transistors 26 of output drive bridge stages 24B and 24C are selectively turned on and the currents in the B and C phases from the phase windings PhB and PhC flow toward the motor power supply node 30, while the low side drive transistor 28 of output drive bridge stage 24A is also selectively turned on and the current in the A phase into the phase winding PhA comes from the ground node 32, and all other power MOSFETs are turned off. Thus, the recirculation loop of the three currents of the windings of the motor closes through the hold capacitor 46 connected between the supply nodes 30 and 32 and effectively charges that capacitor.

Lastly, an active brake phase is performed. The motor controller generates the Hx and Lx control signals to selectively turn on the certain other ones of the power MOSFETs (i.e., the MOSFETSs which were turned off in the third phase) and selectively turn off the certain ones of the power MOSFETs (i.e., the MOSFETs which were turned on in the third phase), this operation being dependent on the angular position of the rotor and is opposite the on/off control exercised in the active step-up phase. The point here is that for the certain angular position of the rotor indicative of the one of the current circulation directions based on rotor position that is active and the identified certain ones of the power MOSFETs that are turned on (and the certain other ones of the power MOSFETs) during the active step-up phase, the immediately succeeding active brake phase with the same relative angular position of the rotor and same one of the current circulation directions based on rotor position operates to control the power MOSFETs oppositely with, instead, the certain other ones of the power MOSFETs turned on and the certain ones of the power MOSFETs turned off. During the active brake phase, the three currents in the windings of the motor recirculate through the selectively turned on ones of the power MOSFETs. With respect to the same example current circulation direction based on rotor position, the low side drive transistors 28 of output drive bridge stages 24B and 24C are selectively turned on and the currents in the B and C phases into the phase windings PhB and PhC comes from the ground node 32, while the high side drive transistor 26 of output drive bridge stage 24A is also selectively turned on and the current in the A phase from the phase winding PhA flows toward the motor power supply node 30, and all other power MOSFETs are turned off. Thus, the recirculation loop of the three currents of the windings of the motor closes through the hold capacitor 46 connected between the supply nodes 30 and 32.

It is important to know rotor position prior to switching from the tristate phase to the active step-up phase. The motor controller 40 may operate with an included sensing circuit to detect rotor position by sensing voltages at the control terminals A, B and C (and perhaps also CT) of the multiphase spindle motor 12. This rotor position detection provides information that is indicative of which one of the six possible current circulation directions is currently active. From the determination of the active current circulation direction, the motor controller 40 can make a proper selection of the high-side and low-side transistors to be turned on/off in order to properly implement the active step-up phase. Likewise, when moving to the immediately succeeding active brake phase, the motor controller 40 can oppositely select the on/off state of the high-side and low-side transistors.

Figure 5:
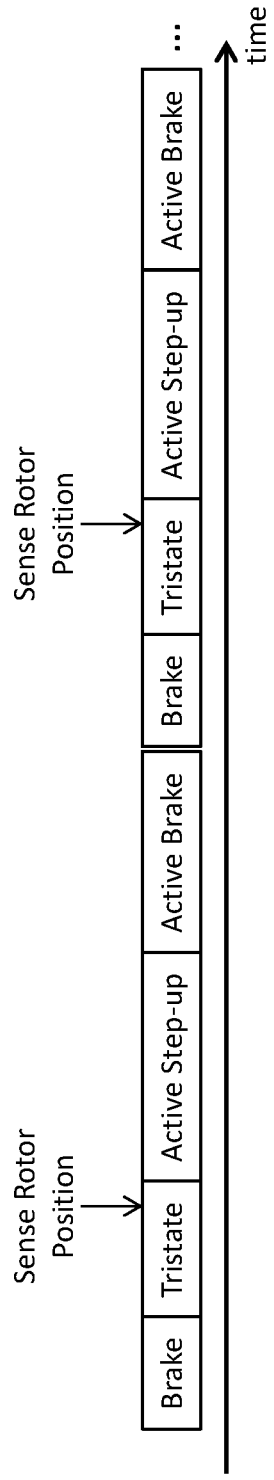
FIG. 5 is a timing diagram for a process for recovery of the back electromotive force induced in the phase windings of the spindle motor.

FIG. 5 shows a timing diagram for the recovery process using the first (brake) phase followed by the second (tristate) phase followed by the third (active step-up) phase followed by the fourth (active brake) phase. These four phases are sequentially repeated and implemented with respect to the same one of the six possible current circulation directions that is detected based on rotor position. Every time the configuration of the output bridge stage switches from the "brake" configuration to the "tristate" and then "active step-up" configurations, the recirculating motor current charges the capacitor 46. This causes the voltage on the supply node 30 to be incremented. The operation to sense motor voltages and detect rotor position occurs during each tristate phase. Each time the configuration of the output bridge stage switches from the "active step-up" configuration to the "active brake" configuration, the current flow in the motor windings is jump started in preparation for the subsequent switch to the "brake" configuration.

Figure 6:
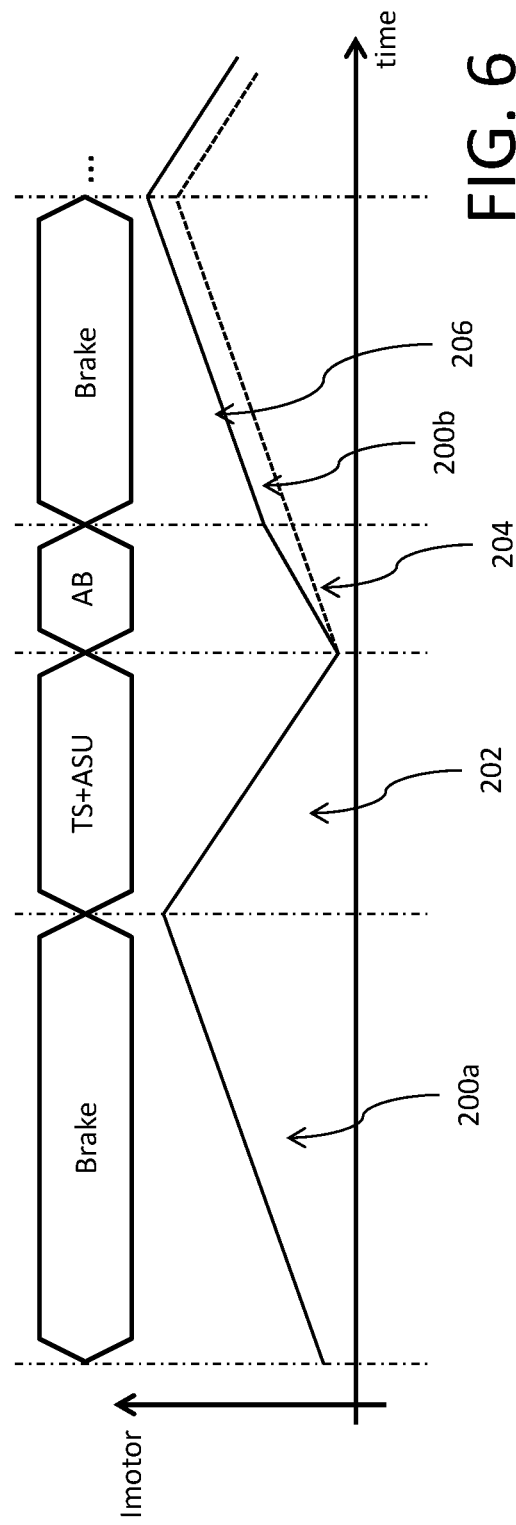
FIG. 6 is a timing diagram illustrating motor current.

FIG. 6 shows the motor current as a function of time and the advantageous effect of including the fourth (active brake) phase. During the first (brake) phase, motor current increases. During the second (tristate) phase and third (active step-up) phase, designated by "TS+ASU," motor current decreases as the hold capacitor 46 is being charged. During the fourth (active brake) phase, designated by "AB," motor current increases and provides a jump start for motor current increase in the subsequent first (brake) phase. As a result, a higher magnitude current is made available at the end of the subsequent first (brake) phase. The dotted line in FIG. 6 shows the motor current level that would be achieved at the end of the subsequent first (brake) phase in the absence of the use of the fourth (active brake) phase.

An advantage of this process which includes the active step-up followed immediately by the active brake is that an increased magnitude of current is pulled from the spindle motor (operating as a generator). This increased magnitude of current not only provides for a better charging of the capacitor but also causes the spindle motor slow down more quickly.

Figure 7:
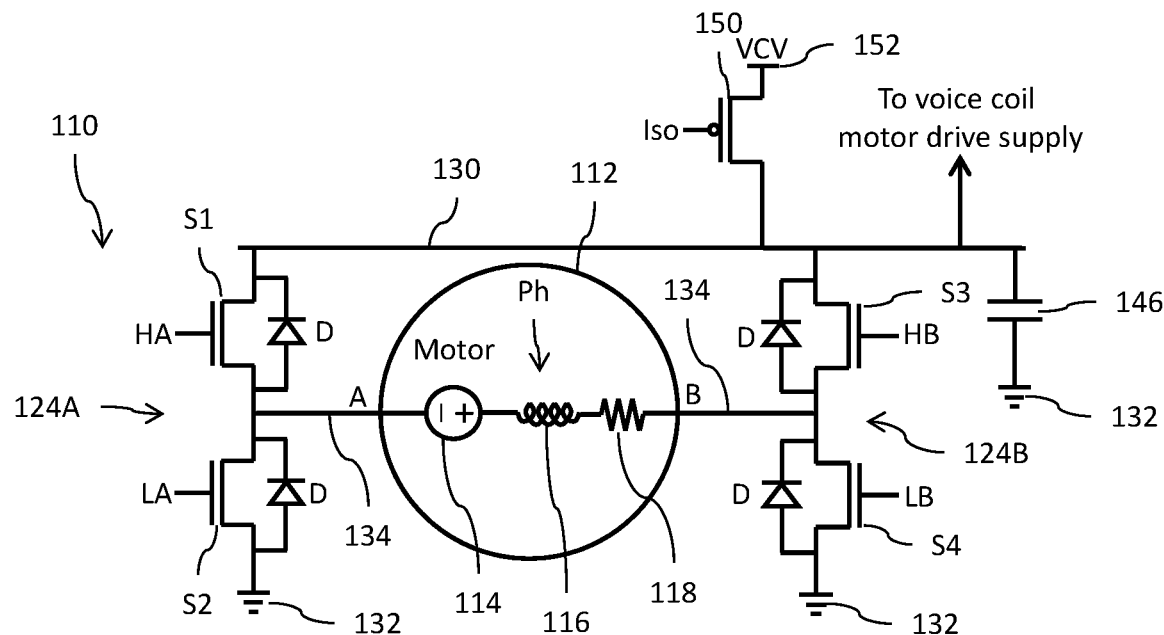
FIG. 7 is a simplified circuit diagram of an output drive bridge circuit for driving a motor in accordance with the process of FIG. 5 producing the motor current of FIG. 6.

FIG. 7 shows a simplified circuit diagram of an output drive bridge circuit 110 for driving a motor 112. The motor 112 may, for example, comprise a multiphase spindle motor 12 such as a three-phase motor as previously described. In the illustrated simplification, only two control terminals A and B of the motor 112 are shown. These control terminals may, for example, be connected to a first phase winding PhA and a second phase winding PhB, respectively, of the motor 112 which are connected to each other at a center tap node in a Y-type configuration. Alternatively, a single phase winding may be connected between the two control terminals A and B of the motor in a delta (Δ)-type configuration. In any case, the phase winding Ph is represented by its equivalent circuit schematic comprising the series electrical connection of a back EMF voltage 114, an inductance 116 and a resistance 118.

The output drive bridge circuit 110 includes a first output drive bridge stage 124A and a second output drive bridge stage 124B. Each output drive bridge stage 124 is configured as a half-bridge driver including a high side drive transistor S1 or S3 in series electrical connection with a low side driver transistor S2 or S4 between a motor power supply node 130 and a ground node 132. In particular, the source-drain paths of the transistors S1/S2 and S3/S4 are connected in series at a drive node 134 which is electrically connected to a corresponding control terminal A or B of the multiphase spindle motor 112. The transistors S1-S4 are conventionally formed by n-channel power MOSFET devices. The drain of transistor S1/S3 is connected to the power supply node 130, the source of transistor S1/S3 is connected to the drive node 134, the drain of transistor S2/S4 is connected to the drive node 134 and the source of transistor S2/S4 is connected to the ground node 132. The gate terminal of the transistor S1/S3 is driven by a high side control signal Hx and the gate terminal of the transistor S2/S4 is driven by a low side control signal Lx. The high side control signals Hx and the low side control signals Lx are generated by a motor controller circuit 140.

The external hold capacitor 146 is connected between the motor power supply node 130 and the ground node 132. An isolation transistor 150, for example, a p-channel MOSFET device, is connected between an external power supply node 152 and the motor power supply node 130. The external power supply node 152 is configured to receive an externally applied supply voltage VCV. The isolation transistor 150 is deactuated by the motor controller circuit 140 using control signal Iso in order to isolate the motor power supply node 130 from the external supply voltage VCV in the event the external supply voltage VCV is interrupted. In response to such an interruption, the back electromotive forces that are induced in the phase winding Ph of the rotating motor 112 are rectified and a current is generated for charging the external hold capacitor 146 so as to hopefully maintain a voltage level at the motor power supply node 130 which is sufficient for a limited time period to power the control circuitry and drivers of the voice coil motor (VCM) to safely park the pick-up carrying arm.

The output drive bridge circuit 110 is operated in accordance with the process discussed above in connection with FIG. 5.

Figure 8:
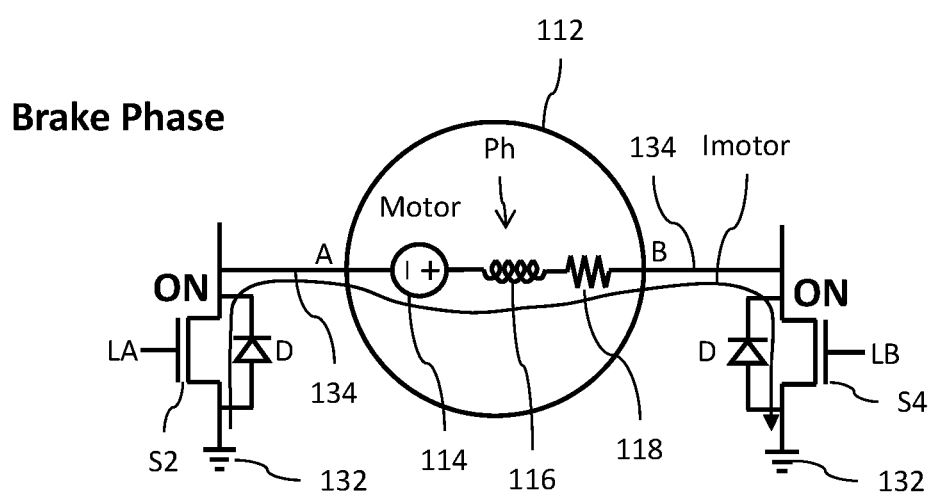
FIG. 8 illustrates operation of the circuit of FIG. 7 in a brake phase.

FIG. 8 shows the connection of the terminals A and B of the motor 112 during the first (brake) phase. The motor controller circuit 140 generates the high side control signals Hx and the low side control signals Lx so as to cause the power transistors S1 and S3 to be turned off and cause the power transistors S2 and S4 to be turned on. In this configuration, the terminals A and B of the motor 112 are both connected to the ground node 132. An increasing motor current Imotor as shown at reference 200a in FIG. 6 is generated in response to rotor spin.

Figure 9:
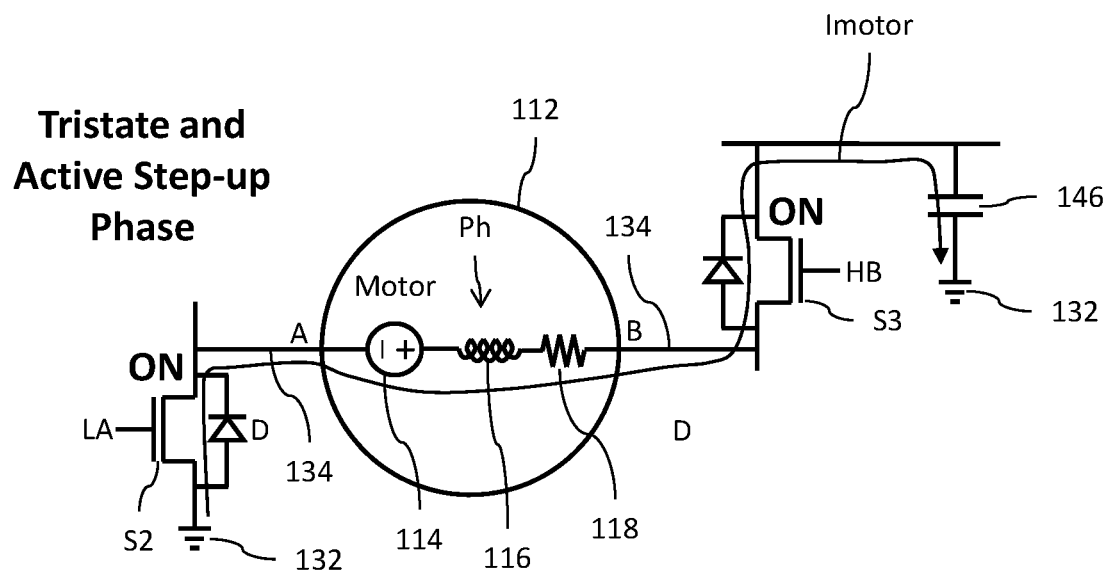
FIG. 9 illustrates operation of the circuit of FIG. 7 in a tristate/active step-up phase.

FIG. 9 shows the connection of the terminals A and B of the motor 112 during the second (tristate) phase and third (active step-up) phase. The motor controller circuit 140 initially generates the high side control signals Hx and the low side control signals Lx for the tristate phase so as to cause the power transistors S1-S4 to all be turned off. Then, the motor controller circuit 140 generates the high side control signals Hx and the low side control signals Lx so as to cause the power transistors S2 and S3 to be turned on and cause the power transistors S1 and S4 to be turned off. In this configuration, the terminal A is connected to the ground node 132 and terminal B of the motor 112 is connected to the motor power supply node 130. A decreasing motor current Imotor as shown at reference 202 in FIG. 6 is generated to charge the external hold capacitor 146. It will be understood that the current flow in the second (tristate) phase passes through the intrinsic diodes D of transistors S2 and S3, while the current flow in the third (active step-up) phase passes through the source-drain conduction paths of the transistors S2 and S3. An advantage of the third (active step-up) phase over the second (tristate) phase is avoidance of the diode voltage drop while charging the external hold capacitor 146.

Figure 10:
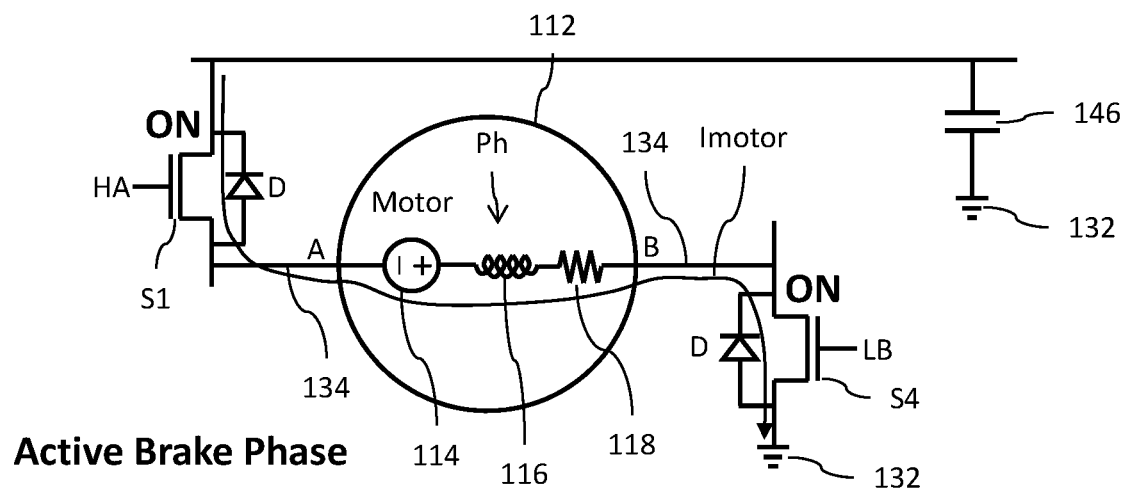
FIG. 10 illustrates operation of the circuit of FIG. 7 in an active brake phase.

FIG. 10 shows the connection of the terminals A and B of the motor 112 during the fourth (active brake) phase. The motor controller circuit 140 generates the high side control signals Hx and the low side control signals Lx so as to cause the power transistors S1 and S4 to be turned on and cause the power transistors S2 and S3 to be turned off. It will be noted that is the opposite conduction state for transistors S1-S4 in comparison to the third (active step-up) phase. In this configuration, the terminal A of the motor 112 is connected to the motor power supply node 130 and terminal B of the motor 112 is connected to the ground node 132. Again, it will be noted that this is the opposite connection state for the motor terminals in comparison to the third (active step-up) phase. An increasing motor current Imotor as shown at reference 204 in FIG. 6 is generated in response to rotor spin. The slope of this increasing motor current Imotor at reference 204 is greater than the slope of the increasing motor current associated with the first (brake) phase (dotted line current; reference 200b).

The process then repeats with a return to the first (brake) phase and the configuration as shown in FIG. 8. The motor controller circuit 140 generates the high side control signals Hx and the low side control signals Lx so as to cause the power transistors S1 and S3 to be turned off and cause the power transistors S2 and S4 to be turned on. In this configuration, the terminals A and B of the motor 112 are both connected to the ground node 132. An increasing motor current Imotor as shown at reference 206 in FIG. 6 is generated in response to rotor spin. Because of the jump start of the motor current provided by implementation of the fourth (active brake) phase, the motor current at reference 206 will reach a higher level than could have been achieved in the absence of use of the fourth (active brake) phase as shown by reference 200b.

The same direction of current through the motor windings is applicable to each of the phases. For that same motor current direction, FIGS. 9 and 10 show that the change from active step-up to active brake implements the opposite ON/OF driving of the switch transistors with respect to that motor current direction. In the active step-up phase of FIG. 9, that motor current is applied to charge the capacitor 146 while in the active brake phase of FIG. 10 that motor current is used to jump start the current which will be generated during the subsequent first (brake) phase (FIG. 8). This increase in current advantageously provides for a better charging of the capacitor and further causes an increase in the rate by which the spindle motor slows down.

Alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method for charging a hold capacitor coupled between power supply nodes of output transistor half-bridge stages driving a multiphase motor, comprising:
responding to a failure of an external power supply by performing the following sequence of operations:
a) switching MOS transistors of the output transistor half-bridge stages to implement a brake configuration wherein either high-side MOS transistors or low-side MOS transistors of the output transistor half-bridge stages are turned on;
b) then switching MOS transistors of the output transistor half-bridge stages to implement an active step-up configuration wherein the high-side MOS transistor of a first output transistor half-bridge stage and the low-side MOS transistor of a second output transistor half-bridge stage are both turned on and wherein the low-side MOS transistor of the first output transistor half-bridge stage and the high-side MOS transistor of the second output transistor half-bridge stage are both turned off; and
c) then switching MOS transistors of the output transistor half-bridge stages to implement an active brake configuration wherein the low-side MOS transistor of the first output transistor half-bridge stage and the high-side MOS transistor of the second output transistor half-bridge stage are both turned on and wherein the high-side MOS transistor of the first output transistor half-bridge stage and the low-side MOS transistor of the second output transistor half-bridge stage are both turned off.

2. The method of claim 1, further comprising the step of repeating steps a)-c).

3. The method of claim 1, further comprising, after step a) and before step b), switching MOS transistors of the output transistor half-bridge stages to implement a tristate configuration wherein the high-side MOS transistors of the first and second output transistor half-bridge stages and the low-side transistors of the first and second output transistor half-bridge stages are all turned off.

4. The method of claim 3, further comprising:
sensing a voltage at terminals of the multiphase motor during the tristate configuration;
determining a rotor position based on the sensed voltage; and
selecting the high-side MOS transistor of the first output transistor half-bridge stage and the low-side transistor of the second output transistor half-bridge stage be both turned on based on the determined rotor position.

5. The method of claim 1, wherein switching MOS transistors of the output transistor half-bridge stages to implement the active step-up configuration causes the multiphase motor to generate a charging current in response to motor rotation following failure of the external power supply, the method further comprising applying the charging current to the hold capacitor to generate a voltage stored by the hold capacitor.

6. The method of claim 5, further comprising using the voltage stored by the hold capacitor to power operation of a further motor different than said multiphase motor.

7. The method of claim 6, wherein the multiphase motor is a spindle motor of a disk drive and wherein the further motor is a voice coil motor of said disk drive.

8. The method of claim 1, further comprising before step b):
sensing a voltage at terminals of the multiphase motor;
determining a rotor position based on the sensed voltage; and
selecting the high-side MOS transistor of the first output transistor half-bridge stage and the low-side transistor of the second output transistor half-bridge stage be both turned on based on the determined rotor position.

9. A circuit for driving a multiphase motor, comprising:
a power supply node configured to receive an external power supply for powering the multiphase motor;
a common reference node;
a plurality of half bridges coupled between said power supply node and said common reference node, each half bridge comprising a high-side MOS transistor, a low-side MOS transistor and an output node coupled to a respective winding terminal of the multiphase motor; and
a control circuit configured to:
sense a failure of the external power supply and perform the following sequence of operations:
a) switch MOS transistors of the half bridges to implement a brake configuration wherein either high-side MOS transistors or low-side MOS transistors of the half bridges are turned on;
b) then switch MOS transistors of the half bridges to implement an active step-up configuration wherein the high-side MOS transistor of a first half bridge and the low-side MOS transistor of a second half bridge are both turned on and wherein the low-side MOS transistor of the first half bridge and the high-side MOS transistor of the second half bridge are both turned off; and
c) then switch MOS transistors of the half bridges to implement an active brake configuration wherein the low-side MOS transistor of the first half bridge and the high-side transistor of the second half bridge are both turned on and wherein the high-side MOS transistor of the first half-bridge and the low-side transistor of the second half bridge are both turned off.

10. The circuit of claim 9, further comprising a hold capacitor coupled between said power supply node and said common reference node, and wherein the active step-up configuration generates a current for charging the hold capacitor to generate a voltage stored by the hold capacitor.

11. The circuit of claim 10, further comprising a further motor different than said multiphase motor that is powered from the power supply node and the voltage stored by the hold capacitor.

12. The circuit of claim 11, wherein the multiphase motor is a spindle motor of a disk drive and wherein the further motor is a voice coil motor of said disk drive.

13. The circuit of claim 9, wherein the brake configuration causes the multiphase motor to generate a first current in a phase winding of the multiphase motor in response to motor rotation following failure of the external power supply, and wherein the active brake configuration causes the multiphase motor to generate a second current in the phase winding of the multiphase motor in response to motor rotation following failure of the external power supply having a slope which is greater than a slope of the first current.

14. The circuit of claim 9, wherein the control circuit is further configured to cause steps a)-c) to be repeated.

15. The circuit of claim 9, wherein the control circuit is further configured to perform an operation, after a) and before b), to switch MOS transistors of the half-bridges to implement a tristate configuration wherein the high-side MOS transistors of the first and second half-bridges and the low-side transistors of the first and second half-bridges are all turned off.

16. A method for charging a hold capacitor coupled between power supply nodes of output transistor half-bridge stages driving a multiphase motor, comprising:
responding to a failure of an external power supply by performing the following sequence of operations:
a) switching MOS transistors of the output transistor half-bridge stages to implement a brake configuration wherein either high-side MOS transistors or low-side MOS transistors of the output transistor half-bridge stages are turned on;
b) detecting a direction of current flow through the multiphase motor;
c) based on the detected direction of current flow, selecting the high-side MOS transistor of one of the output transistor half-bridge stages and the low-side MOS transistor of another of the output transistor half-bridge stages to be both turned on to charge the hold capacitor in an active step-up phase of operation; and
d) based on that same detected direction of current flow, selecting the high-side MOS transistor of the another one of the output transistor half-bridge stages and the low-side MOS transistor of said one of the output transistor half-bridge stages to be both turned on to jump start current flow in an active brake phase of operation prior to a subsequent implementation of the brake configuration.

17. The method of claim 16, wherein step c) further comprises selecting the low-side MOS transistor of the one of the output transistor half-bridge stages and the high-side MOS transistor of the another of the output transistor half-bridge stages to be both turned off during the active step-up phase of operation.

18. The method of claim 16, wherein step d) further comprises selecting the low-side MOS transistor of the another one of the output transistor half-bridge stages and the high-side MOS transistor of said one of the output transistor half-bridge stages to be both turned off during the active brake phase of operation.

19. The method of claim 16, further comprising the step of repeating steps a)-d).

20. The method of claim 16, further comprising, before step c), step d) switching MOS transistors of the output transistor half-bridge stages to implement a tristate configuration wherein the high-side MOS transistors of the output transistor half-bridge stages and the low-side transistors of the output transistor half-bridge stages are all turned off.

21. The method of claim 20, wherein step b) is performed during step d).

22. The method of claim 16, further comprising using the charge stored by the hold capacitor to power operation of a further motor different than said multiphase motor.

23. The method of claim 22, wherein the multiphase motor is a spindle motor of a disk drive and wherein the further motor is a voice coil motor of said disk drive.

24. A circuit for driving a multiphase motor, comprising:
a power supply node configured to receive an external power supply for powering the multiphase motor;
a common reference node;
a hold capacitor coupled between said power supply node and said common reference node;
a plurality of half bridges coupled between said power supply node and said common reference node, each half bridge comprising a high-side MOS transistor, a low-side MOS transistor and an output node coupled to a respective winding terminal of the multiphase motor; and
a control circuit configured to:
sense a failure of the external power supply and perform the following sequence of operations:
a) switch MOS transistors of the output transistor half-bridge stages to implement a brake configuration wherein either high-side MOS transistors or low-side MOS transistors of the output transistor half-bridge stages are turned on;
b) detect a direction of current flow through the multiphase motor;
c) based on the detected direction of current flow, select the high-side MOS transistor of one of the output transistor half-bridge stages and the low-side MOS transistor of another of the output transistor half-bridge stages to be both turned on to charge the hold capacitor in an active step-up phase of operation; and
d) based on that same detected direction of current flow, select the high-side MOS transistor of the another one of the output transistor half-bridge stages and the low-side MOS transistor of said one of the output transistor half-bridge stages to be both turned on to jump start current flow in an active brake phase of operation prior to a subsequent implementation of the brake configuration.

25. The circuit of claim 24, further comprising a further motor powered from the power supply node and the charge stored by the hold capacitor.

26. The circuit of claim 25, wherein the multiphase motor is a spindle motor of a disk drive and wherein the further motor is a voice coil motor of said disk drive.

27. The circuit of claim 24, wherein a first current in a phase winding of the multiphase motor is generated in the brake configuration, and wherein a second current in the phase winding of the multiphase motor in generated in the active brake configuration, said second current having a slope which is greater than a slope of the first current.

28. The circuit of claim 24, wherein the control circuit is further configured to cause steps a)-c) to be repeated.

29. The circuit of claim 24, wherein the control circuit is further configured to perform an operation, before c), to switch all MOS transistors of the output transistor half-bridge stages off to implement a tristate configuration.

* * * * *